US009215703B2

(12) United States Patent  
Jeong et al.

(10) Patent No.: US 9,215,703 B2  
(45) Date of Patent: *Dec. 15, 2015

(54) METHOD OF TRANSMITTING SCHEDULING REQUEST IN MOBILE COMMUNICATION SYSTEM AND TERMINAL APPARATUS FOR THE SAME

(71) Applicant: Samsung Electronics Co., Ltd., Gyeonggi-do (KR)

(72) Inventors: Kyeong-In Jeong, Gyeonggi-do (KR); Soeng-Hun Kim, Gyeonggi-do (KR); Sung-Ho Choi, Gyeonggi-do (KR); Gert Jan Van Lieshout, Middlesex (GB); Himke Van Der Velde, Middlesex (GB)

(73) Assignee: Samsung Electronics Co., Ltd (KR)

( * ) Notice: Subject to any disclaimer, the term of this patent is extended or adjusted under 35 U.S.C. 154(b) by 222 days.

This patent is subject to a terminal disclaimer.

(21) Appl. No.: 13/945,586

(22) Filed: Jul. 18, 2013

(65) Prior Publication Data

US 2013/0308574 A1 Nov. 21, 2013

Related U.S. Application Data

(63) Continuation of application No. 13/546,504, filed on Jul. 11, 2012, now Pat. No. 8,503,385, which is a continuation of application No. 11/766,433, filed on Jun. 21, 2007, now Pat. No. 8,243,660.

(30) Foreign Application Priority Data

Jun. 22, 2006 (KR) .......................... 10-2006-0056414

(51) Int. Cl.  
*H04W 72/04* (2009.01)  
*H04L 12/54* (2013.01)  
(Continued)

(52) U.S. Cl.  
CPC ....... *H04W 72/0413* (2013.01); *H04L 12/5695* (2013.01); *H04L 47/15* (2013.01);  
(Continued)

(58) Field of Classification Search  
CPC .................................................. H04W 72/0413  
See application file for complete search history.

(56) References Cited

U.S. PATENT DOCUMENTS 6,400,695 B1 6/2002 Chuah et al.  
6,571,101 B1 5/2003 Schulz  
(Continued)

FOREIGN PATENT DOCUMENTS

RU          2175464        10/2001  
WO        WO9826523         6/1998  
(Continued)

*Primary Examiner* — Jason Mattis  
(74) *Attorney, Agent, or Firm* — The Farrell Law Firm, P.C.

(57) ABSTRACT

A method and apparatus are provided for transmitting an uplink scheduling request in a mobile communication system. Scheduling request transmission cycles are set according to priorities between a terminal and a radio resource controlling node. The terminal transmits the scheduling request to the radio resource controlling node according to a scheduling request transmission cycle corresponding to a highest priority among priorities corresponding to uplink data or uplink control signals, if the uplink data or the uplink control signals are generated from an upper layer. The terminal receives scheduling information from the radio resource controlling node, and determines whether resource allocation information is included in the scheduling information. The terminal cyclically transmits the scheduling request to the radio resource controlling node in the scheduling request transmission cycle, if the resource allocation information is not included in the scheduling information.

7 Claims, 12 Drawing Sheets

(51) Int. Cl.
*H04L 12/801* (2013.01)
*H04L 12/911* (2013.01)
*H04L 12/927* (2013.01)
*H04W 74/08* (2009.01)

(52) U.S. Cl.
CPC ........... *H04L 47/743* (2013.01); *H04L 47/788* (2013.01); *H04L 47/805* (2013.01); *H04L 47/824* (2013.01); *H04W 74/0875* (2013.01)

(56) References Cited

U.S. PATENT DOCUMENTS

| | | | |
|---|---|---|---|
| 6,597,682 B1 | 7/2003 | Kari | |
| 6,628,949 B1 | 9/2003 | Park | |
| 6,785,252 B1* | 8/2004 | Zimmerman et al. | 370/337 |
| 7,522,564 B2* | 4/2009 | Kakumaru et al. | 370/338 |
| 8,243,660 B2* | 8/2012 | Jeong et al. | 370/329 |
| 8,503,385 B2* | 8/2013 | Jeong et al. | 370/329 |
| 2002/0183066 A1 | 12/2002 | Pankaj | |
| 2003/0086391 A1 | 5/2003 | Terry et al. | |
| 2003/0189948 A1* | 10/2003 | Sashihara | 370/445 |
| 2004/0162083 A1 | 8/2004 | Chen et al. | |
| 2004/0185868 A1 | 9/2004 | Jain et al. | |
| 2005/0025167 A1* | 2/2005 | Ishibashi et al. | 370/412 |
| 2005/0025176 A1* | 2/2005 | Ko et al. | 370/448 |
| 2005/0105553 A1 | 5/2005 | Zhang et al. | |
| 2006/0111104 A1 | 5/2006 | Hyslop | |
| 2007/0081498 A1 | 4/2007 | Niwano | |
| 2007/0121542 A1 | 5/2007 | Lohr et al. | |

FOREIGN PATENT DOCUMENTS

| | | |
|---|---|---|
| WO | WO2004019253 | 3/2004 |
| WO | WO2004043099 | 5/2004 |

* cited by examiner

METHOD OF TRANSMITTING SCHEDULING REQUEST IN MOBILE COMMUNICATION SYSTEM AND TERMINAL APPARATUS FOR THE SAME

PRIORITY

This application is a Continuation Application of U.S. patent application Ser. No. 13/546,504, filed on Jul. 11, 2012, which is a Continuation Application of U.S. Pat. No. 8,243,660, filed on Jun. 21, 2007, which claims priority under 35 U.S.C. §119(a) to an application entitled "Method of Transmitting Scheduling Request in Mobile Communication System and Terminal Apparatus for the Same" filed in the Korean Industrial Property Office on Jun. 22, 2006 and assigned Serial No. 2006-0056414, the contents of which are incorporated herein by reference.

BACKGROUND OF THE INVENTION

1. Field of the Invention

The present invention relates to a method and apparatus for transmitting an uplink scheduling request in a mobile communication system.

2. Description of the Related Art

A multiplexing scheme employed in wireless communication may be divided into a time division multiplexing scheme, a code division multiplexing scheme, an orthogonal frequency division multiplexing scheme and so forth. A multiplexing scheme in most general use today is the code division multiplexing scheme, which is in turn divided into a synchronous scheme and an asynchronous scheme. However, the code division multiplexing scheme suffers from lack of resources because it basically uses codes and thus orthogonal codes are insufficient. Thereupon, the Orthogonal Frequency Division Multiplexing (hereinafter OFDM) scheme is now in the spotlight.

The OFDM scheme, one of data transmission schemes using a multi-carrier, is a type of Multi-Carrier Modulation (hereinafter MCM) scheme in which a serial input symbol stream is converted into parallel symbol sub-streams, the converted symbol sub-streams are modulated with multiple sub-carriers (i.e., multiple sub-carrier channels) orthogonal to each other, and then the modulated symbol sub-streams are transmitted. The OFDM scheme is similar to a Frequency Division Multiplexing (hereinafter FDM) scheme, but is different from the FDM scheme in that orthogonality between multiple sub-carriers is maintained during transmission, and frequency spectrums are overlappingly used. Thus, the OFDM scheme is efficient in the use of frequencies, is robust to frequency selective fading and multi-path fading, and can reduce the effect of inter-symbol interference (hereinafter referred to as "ISI") by using a guard interval. Further, the OFDM scheme can provide optimal transmission efficient in high-speed data transmission because it makes it possible to simply design the structure of an equalizer in hardware and has an advantage of high resistance to impulse noise.

The 3GPP ($3^{rd}$ Generation Partnership Project) is currently discussing a next generation mobile communication system as a substitute for the Universal Mobile Telecommunication Service (hereinafter UMTS) system that is the $3^{rd}$ generation mobile communication standard. Such a next generation mobile communication system is called a Long Term Evolution (hereinafter LTE) system.

FIGS. 1A and 1B illustrate an example of a UMTS-based wireless mobile communication system, that is, a 3GPP LTE system, to which reference is made in the present invention.

Referring to FIG. 1A, a user equipment (hereinafter referred to as "UE") 11 is a terminal for the 3GPP LTE system, and an Evolved Radio Access Network (hereinafter E-RAN) 14 is a radio base station equipment directly involved in communication with a terminal in an existing 3GPP system. The E-RAN 14 serves not only as a node B for managing cells, but also as a Radio Network Controller (hereinafter RNC) for controlling a plurality of node Bs and radio resources. With regard to this, the E-RAN 14 may include an Evolved Node B (hereinafter E-NB) 12 and an Evolved RNC (hereinafter E-RNC) 13 that are physically separated into different nodes, as in an existing 3GPP system, or integrated into one node. By way of example, it is assumed herein that the E-NB 12 and the E-RNC 13 are physically integrated into one node. However, it is obvious that the present invention can be applied in the same manner even if the E-RNC 13 is physically separated from the E-NB 12.

An Evolved Core Network (hereinafter E-CN) 15 is a node into which functions of a Serving GPRS Support Node (hereinafter SGSN) and a Gateway GPRS Support Node (hereinafter GGSN) in an existing 3GPP system are combined. The E-CN 15 is located between a Packet Data Network (hereinafter PDN) and the E-RAN 14, and serves as a gateway for allocating an Internet Protocol (hereinafter IP) address to the UE 11 and connecting the UE 11 with the PDN 16. Since definitions and functions of the SGSN and the GGSN follow the standards specified in 3GPP, a detailed description thereof will be omitted herein.

Referring to FIG. 1B, an Evolved UMTS Radio Access Network (hereinafter E-RAN) 110 has a simplified two node structure of an Evolved Node B (hereinafter E-NB) 120, 122, 124, 126, 128 and an anchor node 130, 132. A User Equipment (hereinafter UE or terminal) 101 is connected with an IP network via the E-RAN 110. Each E-NB 120 to 128 corresponds to an existing Node B of the UMTS system, and is connected with the UE 101 over a radio channel. Dissimilar to the existing Node B, the E-NB 120 to 128 performs more complex functions. In the LTE system, since all user traffics including a real-time service through an IP, such as a Voice over IP (hereinafter VoIP) service, are serviced via a shared channel, an apparatus for collecting and scheduling situation information of UEs is needed. The E-NB 120 to 128 performs the function of such an apparatus.

In general, one E-NB controls a plurality of cells, and Adaptive Modulation & Coding (hereinafter AMC) for determining a modulation scheme and a channel coding rate in conformity with the channel state of a UE is performed in an E-NB. Further, similar to High Speed Downlink Packet Access (hereinafter HSDPA) or High Speed Uplink Packet Access or HSUPA; also called Enhanced-uplink Dedicated Channel or E-DCH of the UMTS system, the LTE system uses Hybrid Automatic Retransmission Request (hereinafter HARQ) between the E-NB 120 to 128 and the UE 101. However, since various Quality of Service (hereinafter QoS) requirements cannot be satisfied by the HARQ alone, an upper layer may perform a separate ARQ (hereinafter outer-ARQ), which also takes place between the UE 101 and the E-NB 120 to 128. The HARQ refers to a technique for increasing a reception success rate by soft-combining retransmitted data with previously received data without discarding the previously received data, and is used for improving transmission efficiency in high-speed packet communication, such as the HSDPA. In order to enable a transmission speed of maximum 100 Mbps, the LTE system is expected to employ the OFDM scheme as radio access technology with a bandwidth of 20 MHz.

FIG. 2 illustrates a procedure in which a UE transmits a scheduling request or buffer status report to an E-NB, based on 3GPP HSUPA technology.

If data or control signals to be transmitted by a UE is generated when no resource is allocated to the UE, the UE transmits a scheduling request or buffer status report to an E-NB in order to request the E-NB to allocate radio resources for transmitting the data or control signals.

The scheduling request and buffer status report are different only in name, and are substantially the same. That is, they correspond to a procedure for informing the E-NB of information on the priorities of data or control signals to be transmitted, the amounts of the data or control signals according to priorities, filled in a buffer, etc. in order to request the E-NB to allocate radio resources for transmitting the data or control signals in uplink. Upon receiving the scheduling request or buffer status report from the UE, the E-NB allocates radio resources to the UE. In the present invention, the scheduling request is abbreviated as "SR", and the buffer status report is abbreviated as "BSR". The SR or BSR may be transmitted by PHY (PHYsical) signaling or MAC (Medium Access Control) signaling.

Referring to FIG. 2, if data or control signals to be transmitted are generated in each of UE#1, UE#2, . . . , and UE#N 201, 202, 203 by an upper layer, each of the UE#1, the UE#2, . . . , and the UE#N 201, 202, 203 transmits an SR/BSR 231, 232, 233 to an E-NB 211. Upon receiving the SR/BSRs 231, 232, 233 from the UEs, the E-NB 211 generally allocates radio resources to each of the UE#1, the UE#2, . . . , and the UE#N 201, 202, 203 when a cell is not loaded with radio resources. The radio resources allocated to each of the UE#1, the UE#2, . . . , and the UE#N 201, 202, 203 are determined by information included in the SR/BSR 231, 232, 233 transmitted from each of the UEs, that is, the corresponding priorities of the data or control signals to be transmitted and the amounts of the data or control signals according to priorities, filled in a buffer.

In FIG. 2, requested radio resources cannot be allocated to all of the UEs because a cell is loaded with radio resources, as designated by reference numeral 221. If the E-NB 211 receives the SR/BSRs 231, 232, 233, but cannot allocate radio resources to all of the UE#1, the UE#2, . . . , and the UE#N 201, 202, 203, IDs of the UEs and radio resource allocation information are not included in scheduling information transmitted in the downlink. If the UEs 201, 202, 203 cannot be allocated with radio resources for uplink transmission from the scheduling information transmitted in the downlink after transmitting the SR/BSRs 231, 232, 233, they retransmit SR/BSRs 241, 242, 243 to the E-NB 211. This is performed on the assumption that the E-NB 211 fails to receive the SR/BSRs 231, 232, 233 transmitted by the UEs. However, at a point of time when the UEs retransmit the SR/BSRs 241, 242, 243 after transmitting the SR/BSRs 231, 232, 233, information on the priorities of the data or control signals to be transmitted by the UEs and the amounts of the data or control signals according to priorities, filled in a buffer, may vary, and thus the SR/BSRs 241, 242, 243 may include different values from those in the SR/BSRs 231, 232, 233.

Although the E-NB 211 receives the SR/BSRs 241, 242, 243, it may not allocate radio resources for uplink transmission, requested by the UE#1, the UE#2, . . . , and the UE#N 201, 202, 203, because a cell is loaded with radio resources, as the time when the E-NB 211 receives the SR/BSRs 231, 232, 233. If IDs of the UEs and radio resource allocation information are not included in scheduling information transmitted in downlink after the SR/BSRs 241, 242, 243 are transmitted, the UEs can know that radio resources for uplink transmission are not allocated.

If the UE#1, the UE#2, . . . , and the UE#N 201, 202, 203 cannot be allocated with requested radio resources for uplink transmission after transmitting the SR/BSRs 241, 242, 243, they retransmit SR/BSRs 251, 252, 253 to the E-NB 211. If the E-NB 211 does not allocate radio resources to the UEs even after receiving the SR/BSRs 251, 252, 253, the UEs 201, 202, 203 retransmit SR/BSRs 261, 262, 263 to the E-NB 211. That is, if the UEs cannot be allocated with radio resources for uplink transmission after transmitting SR/BSRs, they repeatedly retransmit the SR/BSRs. However, when the E-NB 211 does not allocate radio resources for uplink transmission to the UEs not because it fails to receive the SR/BSRs, but because a cell is loaded with radio resources irrespective of successful reception of the SR/BSRs, not only the repetitive SR/BSRs 241, 242, 243, 251, 252, 253, 261, 262, 263 are of no use, but also many problems, including inefficient consumption of radio resources and power consumption of UEs, and unnecessary interference may be caused.

SUMMARY OF THE INVENTION

The present invention has been made to address at least the above problems and/or disadvantages and to provide at least the advantages described below. Accordingly, an aspect of the present invention provides a method and apparatus for preventing useless SR/BSR retransmission from terminals within a cell, which may occur when a radio resource controlling node successfully receives SR/BSRs from the terminals, and yet cannot allocate corresponding radio resources to all of the terminals.

In accordance with an aspect of the present invention, a method is provided for transmitting an uplink scheduling request in a mobile communication system. Scheduling request transmission cycles are set according to priorities between a terminal and a radio resource controlling node. The terminal transmits the scheduling request to the radio resource controlling node according to a scheduling request transmission cycle corresponding to a highest priority among priorities corresponding to uplink data or uplink control signals to thereby request the radio resource controlling node to allocate radio resources for transmitting the uplink data or the uplink control signals, if the uplink data or the uplink control signals are generated from an upper layer. The terminal receives scheduling information from the radio resource controlling node over a resource grant channel, and determines whether resource allocation information is included in the scheduling information. The terminal cyclically transmits the scheduling request to the radio resource controlling node in the scheduling request transmission cycle corresponding to the highest priority among the priorities corresponding to the uplink data or the uplink control signals, if the resource allocation information is not included in the scheduling information.

In accordance with another aspect of the present invention, a terminal apparatus is provided having a buffer manager unit for storing uplink data or uplink control signals, which are transferred from an upper layer, in a buffer, and controlling a scheduling request to be transmitted to a radio resource controlling node according to a status of the buffer to thereby request the radio resource controlling node to allocate radio resources. The terminal apparatus also includes a transceiver unit for transmitting or retransmitting the scheduling request to the radio resource controlling node according to a scheduling request transmission cycle corresponding to a highest priority among priorities corresponding to the uplink data or the uplink control signals, and receiving scheduling information from the radio resource controlling node over a resource allocation channel after transmitting the scheduling request. The terminal apparatus further includes a timer for acquiring transmission cycle information for the scheduling request according to the priorities from the radio resource controlling node through the transceiver unit, and controlling the transceiver unit to cyclically transmit and retransmit the scheduling request in the transmission cycle corresponding to the highest priority, included in the transmission cycle information when the resource allocation information is not included in the scheduling information.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1A:
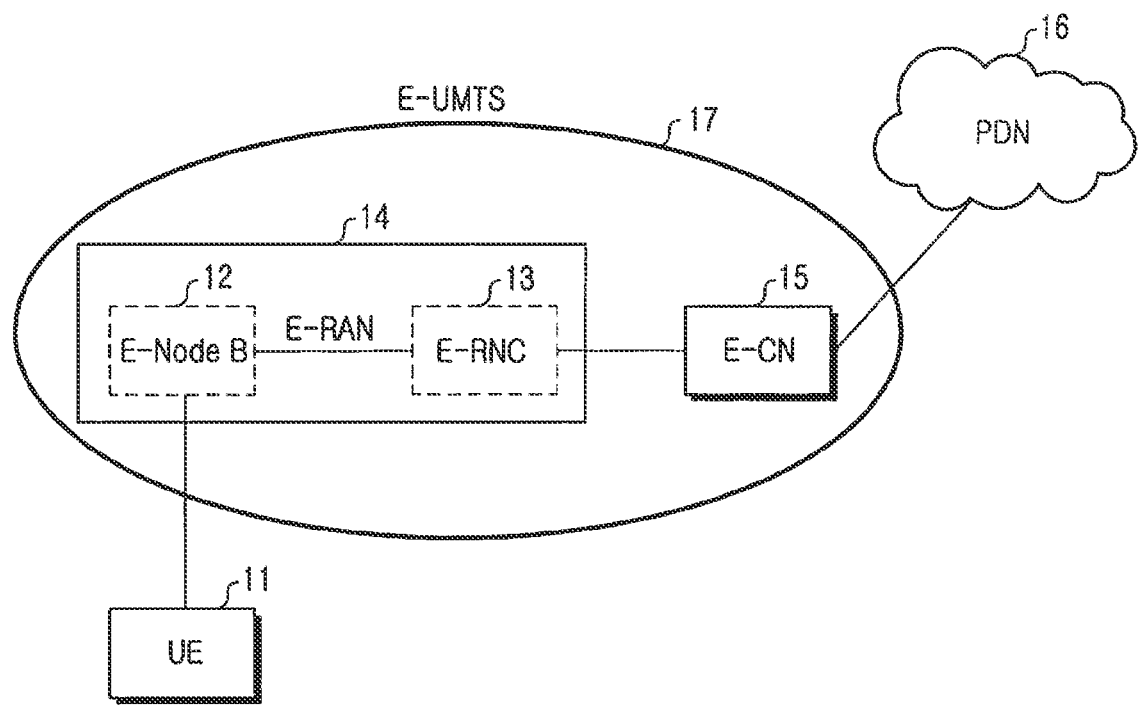
FIGS. 1A and 1B illustrate an example of a mobile communication system to which reference is made in the present invention.
Figure 1B:
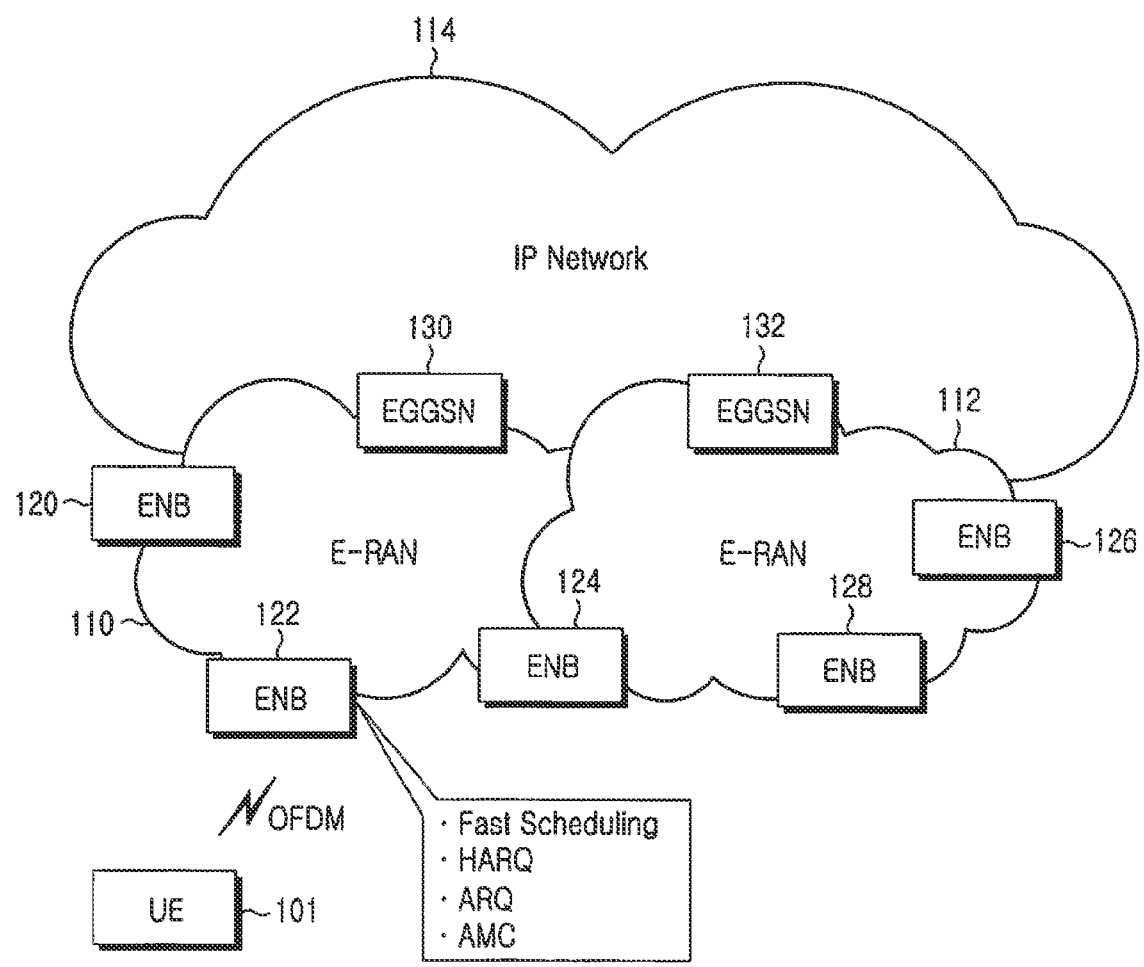
Figure 2:
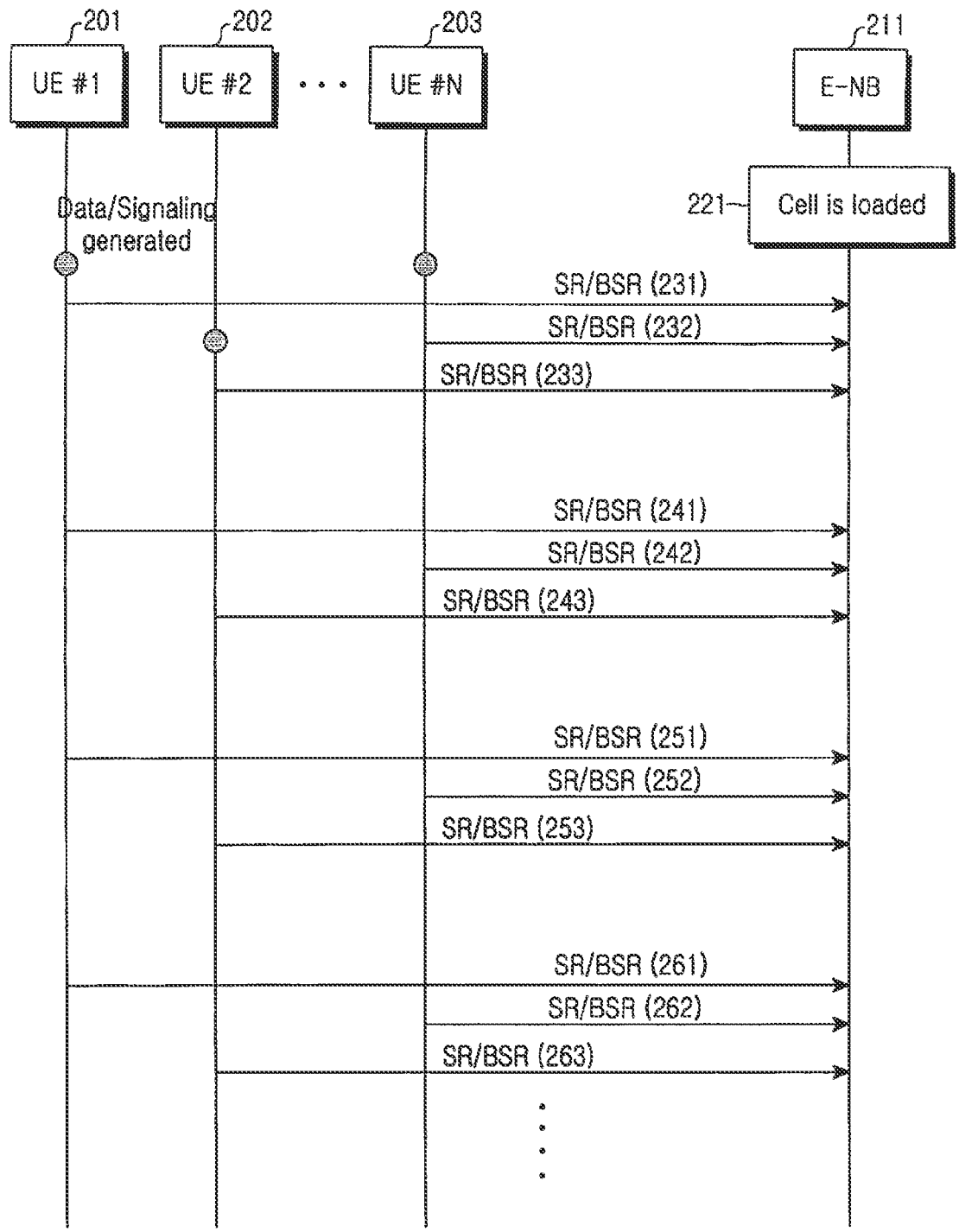
FIG. 2 illustrates a procedure of retransmitting an SR/BSR in a state where a cell is loaded with radio resources.

Embodiments of the present invention are described in detail with reference to the accompanying drawings. The same or similar components may be designated by the same or similar reference numerals although they are illustrated in different drawings. Also, in the following description, a detailed description of known functions and configurations incorporated herein will be omitted for the sake of clarity and conciseness. Further, it should be noted that only parts essential for understanding the operations according to the present invention will be described and a description of parts other than the essential parts will also be omitted for the sake of conciseness.

According to a first embodiment of the present invention, in order to prevent SR/BSRs from being unnecessarily transmitted or retransmitted, an E-NB notifies UEs of the lowest priority in the downlink. The lowest priority refers to the lowest one of priorities included in SR/BSRs for which radio resources have been successfully allocated from among SR/BSRs received by the E-NB. When each of the UEs transmits or retransmits an SR/BSR, it compares the lowest priority with the highest priority among priorities included in the SR/BSR to be transmitted or retransmitted, and determines whether to transmit or retransmit the SR/BSR based on the comparison result. That is, the E-NB optimizes SR/BSR transmission/retransmission by prohibiting useless SR/BSR transmission or retransmission.

Figure 3:
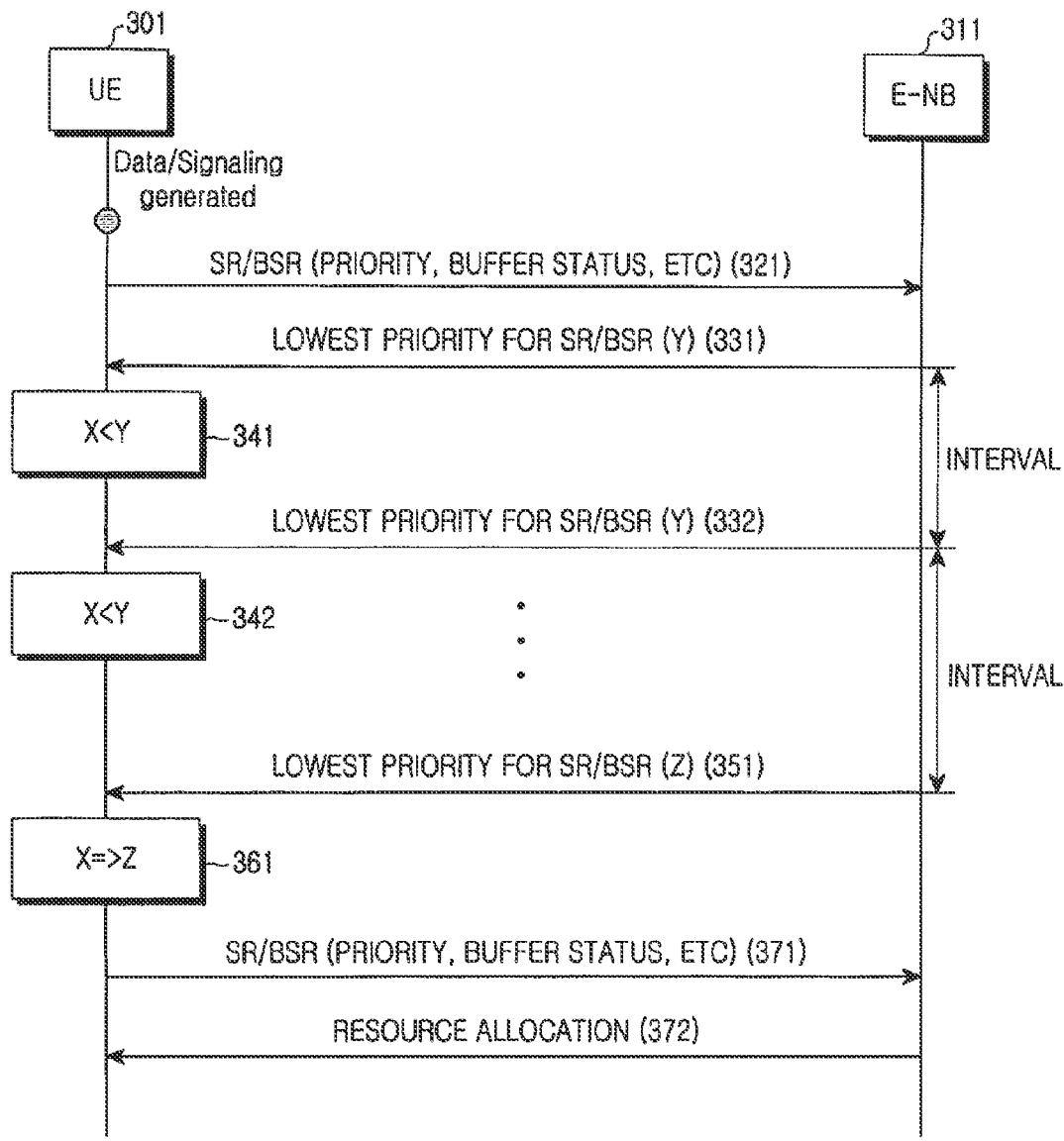
FIG. 3 illustrates a method for efficiently controlling the retransmission of an SR/BSR in a state where a cell is loaded with radio resources in accordance with a first embodiment of the present invention.

FIG. 3 illustrates a method of transmitting/retransmitting an SR/BSR according to the first embodiment of the present invention.

Referring to FIG. 3, if data or control signals to be transmitted in uplink are generated in a UE 301 by an upper layer and transferred to a transmission buffer, the UE 301 transmits an SR/BSR 321 to an E-NB 311 in order to request the E-NB 311 to allocate radio resources for transmitting the data or control signals. The SR/BSR 321 includes information on service priorities according to radio bearers, corresponding to such information as the data or control signals and the amounts of the data or control signals. If data and control signals are transferred together to the transmission buffer or data corresponding to different applications is transferred together to the transmission buffer, a plurality of priorities mapped to the respective data or control signals may be included in the SR/BSR. In this case, the SR/BSR includes information on the amounts of the data or control signals according to priorities starting from the highest priority. In FIG. 3, it is assumed that the highest priority included in the SR/BSR 321 is "X".

Next, the E-NB 311 transmits a notification 331 on the lowest priority, that is, a criterion for permitting SR/BSR transmission, in downlink to UEs within a cell. As an example, the lowest priority for permitting SR/BSR transmission may be set in consideration of (Radio Resource Management (hereinafter RRM) and the lowest one of priorities included in SR/BSRs for which radio resources have been successfully allocated from among SR/BSRs that the E-NB 311 has previously received from UEs within a corresponding cell. For example, when numerous radio resources remain, SR/BSRs from all UEs can be permitted by setting the lowest priority for permitting SR/BSR transmission, which is notified to the UEs, to 1 (or 0) although the lowest priority for radio resource allocation in a previous TTI is 6.

The lowest priority for permitting SR/BSR transmission (hereinafter lowest permissible priority), which is transmitted through the notification 331, allows UEs within a cell to control SR/BSR transmission.

That is, the UE 301 compares the lowest permissible priority included in the notification 331 with the highest priority among service priorities corresponding to the data or control signals transferred to the transmission buffer by the upper layer, which are included in the SR or BSR to be transmitted. If a result of the comparison shows that the highest priority among the service priorities is lower than the lowest permissible priority, the UE 301 does not retransmit the SR/BSR because the E-NB 311 will not allocate radio resources even if the UE 301 retransmits the SR/BSR. In contrast, if the highest priority is equal to or higher than the lowest permissible priority, the UE 301 retransmits the SR/BSR. The lowest priority may be cyclically transmitted over a common channel. As an example, it is assumed herein that the lowest priority, together with scheduling information (hereinafter SI) for informing UEs within a cell of radio resource allocation information for uplink transmission, is transmitted in every sub-frame (here, the sub-frame is a minimum unit for allocating radio resources for uplink transmission to a UE, and radio resource allocation information for uplink transmission may be transmitted to the UE in every sub-frame) over a common channel. However, the present invention does not exclude a scheme in which the lowest priority is cyclically or non-cyclically transmitted over a dedicated channel allocated to each UE, rather than a common channel. In FIG. 3, it is assumed that the lowest permissible priority included in the notification 331 is "Y".

If the UE 301 transmits the SR/BSR 321 to the E-NB 311, but the E-NB 311 does not allocate radio resources for uplink transmission to the UE 301, the UE 301 compares the lowest permissible priority Y, recently notified by the E-NB 311, with the highest priority X included in the SR/BSR 321 to be transmitted, as designated by reference numeral 341. If X is less than Y (X<Y), then the UE 301 does not retransmit the SR/BSR.

Reference numeral 332 indicated that the lowest priority for permitting SR/BSR transmission is cyclically transmitted by the E-NB 311, and reference numeral 342 indicates that the UE 301 receives the cyclically transmitted lowest priority Y and compares it with the highest priority included in an SR/BSR to be transmitted.

In FIG. 3, the lowest permissible priority is continuously transmitted from the E-NB 311 to the UE 301 through notifications 332 to 351. Meanwhile, the 301 does not retransmit the SR/BSR because the transmitted lowest priority Y is still higher than the highest priority X of the SR/BSR.

However, if the lowest permissible priority is changed from Y to Z due to a change in a cell load status, the UE 301 compares the highest priority X of the SI/BSR to be transmitted with the changed lowest permissible priority Z, as designated by reference numeral 361.

If a result of the comparison shows that X is equal to or greater than Z, the UE 301 retransmits the SR/BSR 371 to the E-NB 301. The E-NB 311 allocates radio resources for uplink transmission to the UE 301 and transmits the SI in downlink by using information included in the SR/BSR 371, as designated by reference numeral 372.

Further, when radio bearer setup or reconfiguration is performed so as to receive a specific service, the E-NB sets a MAC logical channel priority for a logical channel corresponding the specific service in such a manner as to match with the service, and informs the UE of the set MAC logical channel priority, thereby enabling priority synchronization between the E-NB and the UE.

In FIG. 3, when data or control signals are generated by an upper layer, and thus an SR/BSR is required to be transmitted in order to request uplink resource allocation, a UE is permitted to initially transmit the SR/BSR, but can retransmit the SR/BSR when the highest priority of the SR/BSR is equal to or greater than the lowest priority for permitting SR/BSR transmission, which is notified in downlink by an E-NB. In other words, when the E-NB does not allocate radio resources for corresponding uplink transmission to the UE (i.e., the ID of the UE and radio resource allocation information are not included in SI received from the E-NB) after the initial transmission of the SR/BSR, and thus the UE needs to retransmit the SR/BSR, only an SR/BSR including the highest priority equal to or greater than the lowest priority notified by the E-NB can be retransmitted.

Although not illustrated in FIG. 3, the lowest priority for permitting SR/BSR transmission, which is notified in downlink by the E-NB, may be applied to from an initial SR/BSR. That is, whether to transmit an initial SR/BSR may be determined by first determining whether the highest priority included in the initial SR/BSR is equal to or higher than the lowest priority.

Further, although not illustrated in FIG. 3, a permissible UE/user class level or a permissible service data rate may be used in the notifications 331, 332 and 351, instead of using the lowest priority for permitting SR/BSR transmission. In this case, an SR/BSR is transmitted only when the class level of a UE or user transmitting the SR/BSR is equal to or higher than a permissible UE/user class level, and is not transmitted when the class level of the UE or user is lower than the permissible UE/user class level. In a similar manner, an SR/BSR is transmitted only when a target service data rate of the SR/BSR is equal to or lower than a permissible service data rate, and is not transmitted when the target service data rate is higher than the permissible service data rate. Further, service priorities included in the SR/BSR may be used in combination with the permissible UE/user class level and the permissible service data rate, for example.

Figure 4A:
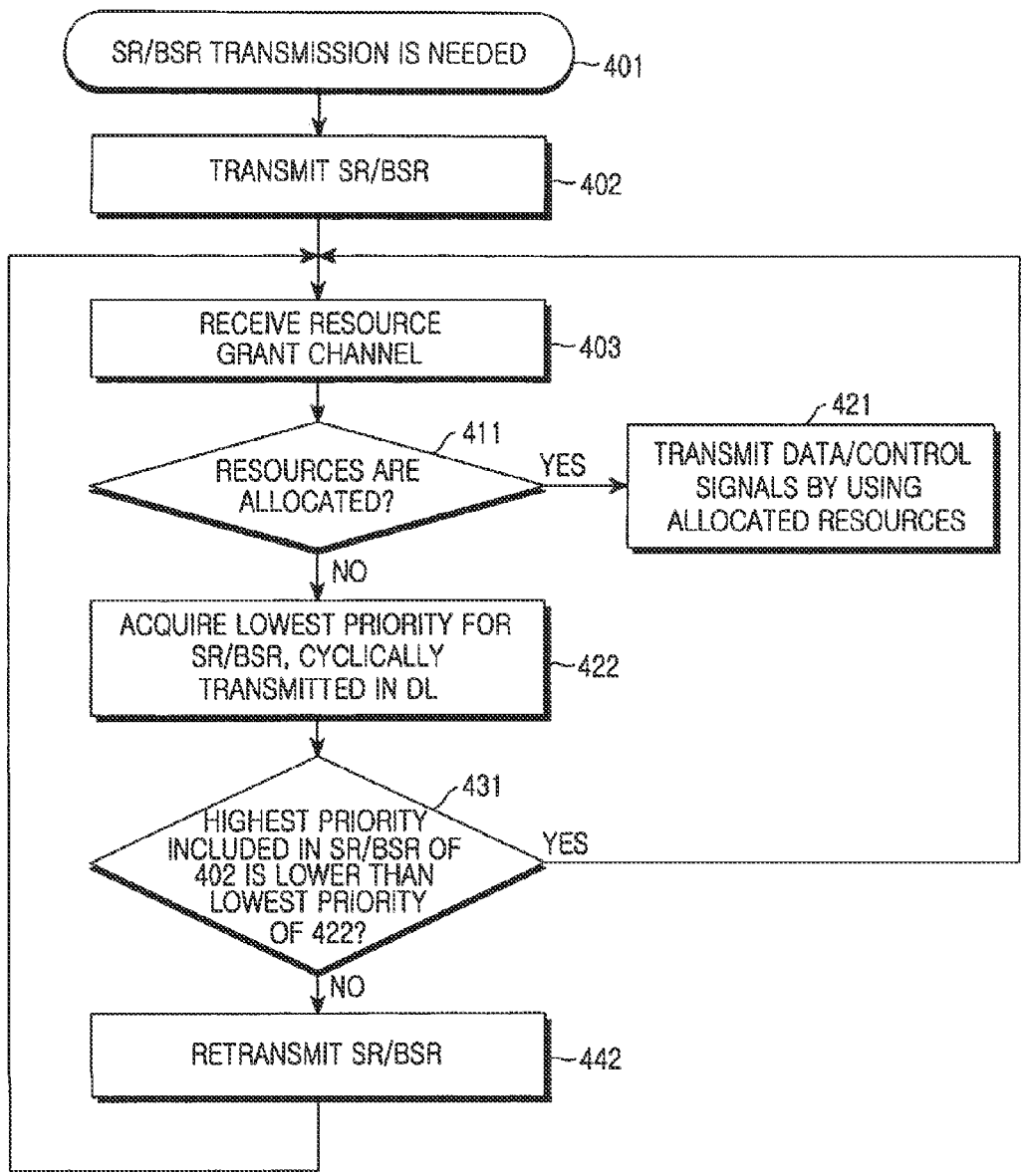
FIGS. 4A and 4B illustrate the operation of a terminal in accordance with the first embodiment of the present invention.
Figure 4B:
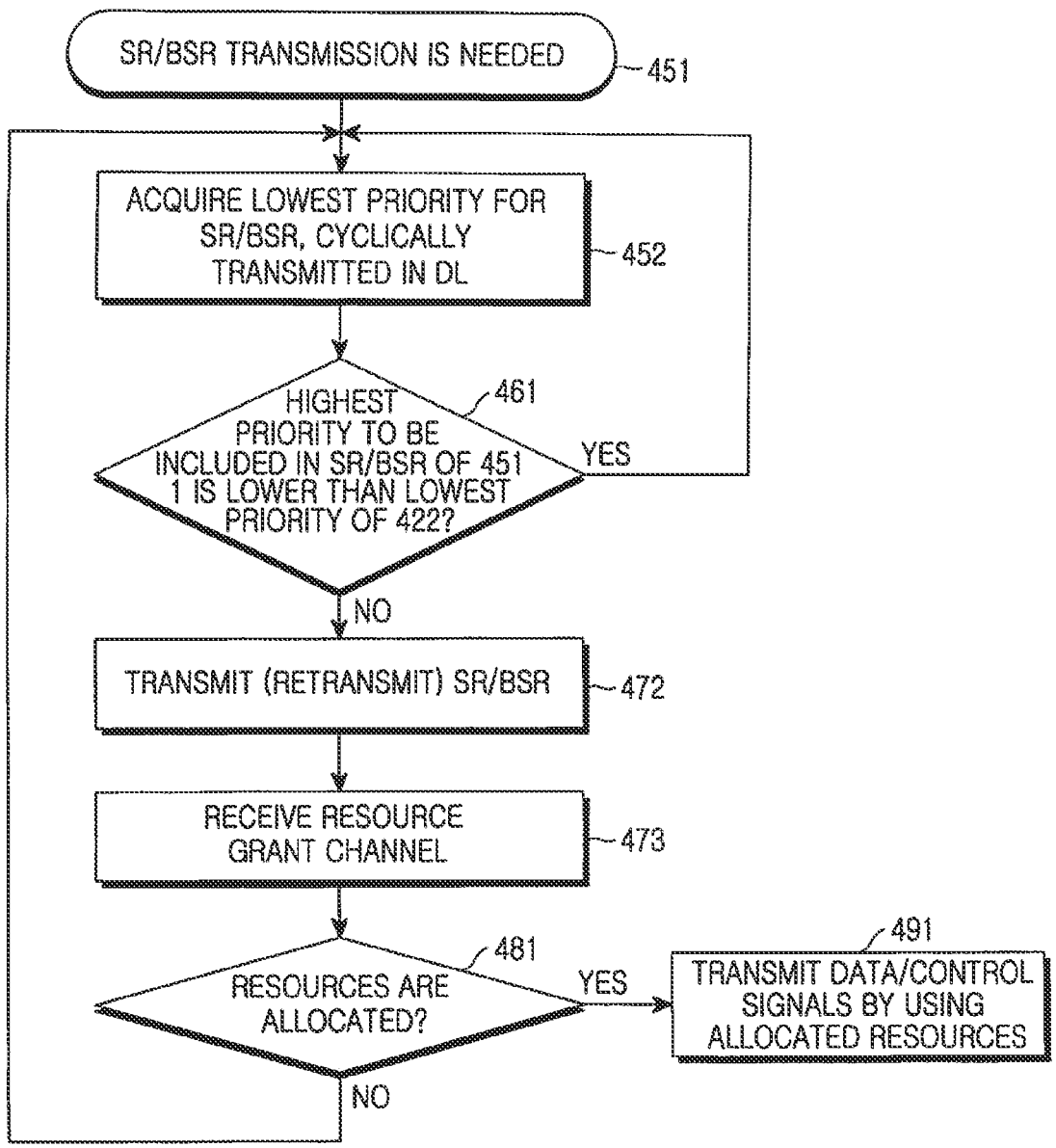

FIGS. 4A and 4B illustrate the operation of a UE according to the first embodiment of the present invention. Of these two drawings, FIG. 4A relates to a method of controlling SR/BSR retransmission by the lowest priority without controlling initial SR/BSR transmission, and FIG. 4B relates to a method of SR/BSR retransmission as well as initial SR/BSR transmission by the lowest priority.

Referring to FIG. 4A, if data or control signals to be transmitted in an uplink are generated by an upper layer and transferred to a transmission buffer in step 401, and thus the UE is required to transmit an SR/BSR, the UE transmits an initial SR/BSR to an E-NB in step 402, and receives a resource grant channel from the E-NB in step 403. SI is transmitted over the resource grant channel, and UEs within a cell can know through the SI which radio resources are allocated to which UEs.

In step 411, the UE, which has transmitted the SR/BSR, determines whether radio resource allocation information for the UE's uplink transmission is included in the SI received over the resource grant channel. If the radio resource allocation information is included in the SI, the UE proceeds to step 421, and transmits the data or control signals in the transmission buffer by using allocated radio resources. However, if the radio resource allocation information for the UEs uplink transmission is not included in the SI received over the resource grant channel, the UE proceeds to step 422, and acquires the lowest priority for permitting SR/BSR transmission, which is cyclically transmitted in downlink.

In step 431, the UE determines whether the highest priority included in the SR/BSR transmitted in step 402 is lower than the lowest priority for permitting SR/BSR transmission, received in step 422.

If a result shows that the highest priority included in the SR/BSR is lower than the lowest priority for permitting SR/BSR transmission, the UE returns to step 403, and receives the resource grant channel. However, if the highest priority is not lower than the lowest priority, the UE proceeds to step 442, retransmits the SR/BSR and then returns to step 403.

Referring to FIG. 4B, if data or control signals to be transmitted in an uplink are generated by an upper layer and transferred to a transmission buffer in step 451, and thus the UE is required to transmit an SR/BSR, in step 452, the UE acquires the lowest priority for permitting SR/BSR transmission, which is cyclically transmitted in downlink from an E-NB. In step 461, the UE compares the highest priority included in the SR/BSR transmitted in step 451 with the lowest priority for permitting SR/BSR transmission, acquired in step 452.

If a result of the comparison shows that the highest priority included in the SR/BSR is lower than the lowest priority for permitting SR/BSR transmission, the UE returns to step 451. However, if the highest priority is not lower than the lowest priority, the UE proceeds to step 472, transmits (or retransmits) the SR/BSR and then receives a resource grant channel in step 473.

In step 481, the UE, which has transmitted the SR/BSR in step 472, determines whether radio resource allocation information for the UE's uplink transmission is included in the resource grant channel received in step 473. If a result shows that the radio resource allocation information is included in the resource grant channel, the UE proceeds to step 491, and transmits the data or control signals in the transmission buffer by using allocated radio resources. However, if the radio resource allocation information is not included in the resource grant channel, the UE returns to step 452.

Figure 5:
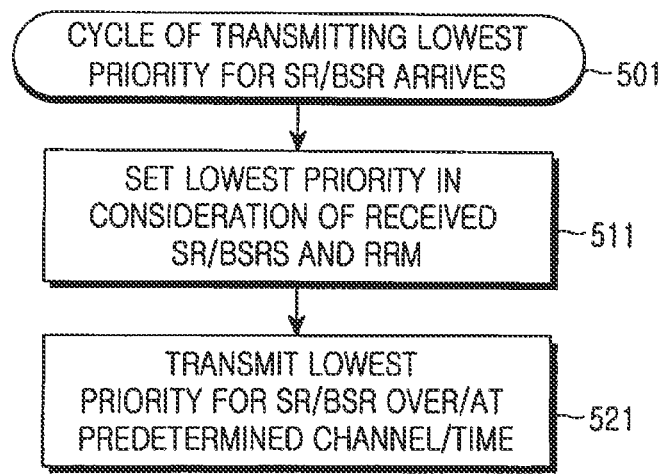
FIG. 5 illustrate the operation of a radio access network in accordance with the first embodiment of the present invention.

FIG. 5 illustrates the operation of an E-NB according to the first embodiment of the present invention.

Referring to FIG. 5, if a cycle in which the lowest priority for permitting SR/BSR transmission is transmitted arrives in step 501, then in step 511, the E-NB sets the lowest priority for permitting SR/BSR transmission by considering the lowest one of priorities included in SR/BSRs for which radio resources have been successfully allocated from among SR/BSRs that the E-NB has already received from UEs within a cell, RRM for managing a cell load status, and other factors. In step 521, the E-NB transmits the lowest priority for permitting SR/BSR transmission, set in step 511, in a downlink at a set time by using a set channel.

Figure 6:
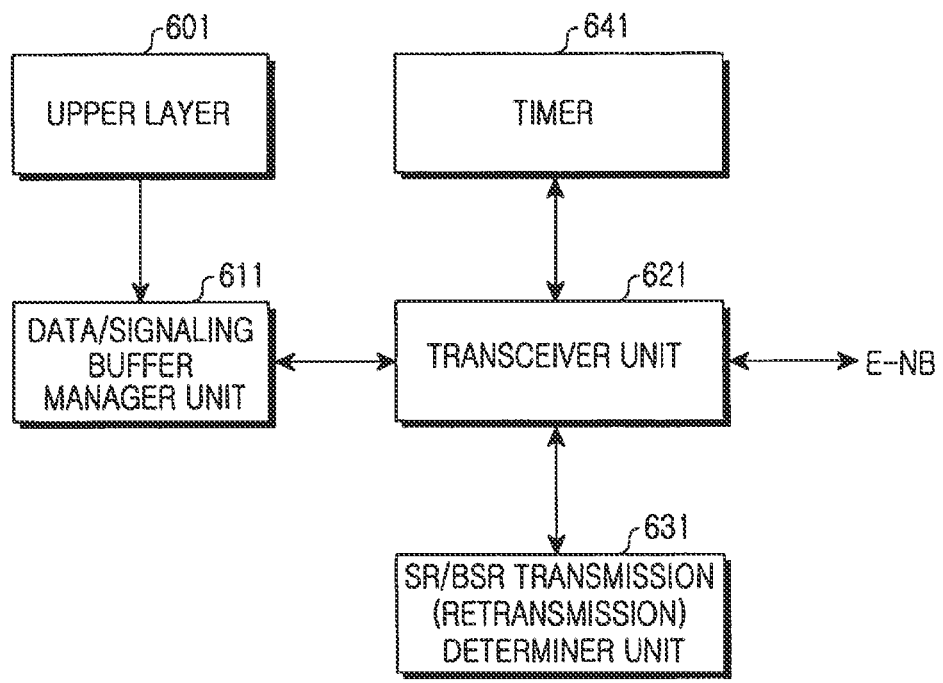
FIG. 6 illustrates the structure of a terminal in accordance with the first embodiment of the present invention.

FIG. 6 illustrates the structure of a UE according to the first embodiment of the present invention.

Referring to FIG. 6, the UE includes an upper layer 601, a data/signaling buffer manager unit 611, a transceiver unit 621, an SR/BSR transmission (retransmission) determiner unit 631 and a timer 641. The upper layer 601 includes both an upper control unit for generating control signals and an upper application unit for generating data.

Data or control signals generated in the upper layer 601 are transferred to a transmission buffer (not shown). If the transmission buffer is filled with the data or control signals transferred from the upper layer 601, the data/signaling buffer manager unit 611 transmits an SR/BSR to an E-NB through the transceiver unit 621 in order to request the E-NB to allocate radio resources for uplink transmission. Using a resource grant channel signal received in the downlink through the transceiver unit 621 after transmitting the SR/BSR, the UE determines whether radio resources for the UE's uplink transmission are allocated. If the radio resources for the UE's uplink transmission are allocated, the UE transmits the data or control signals in the transmission buffer by using the allocated radio resources. However, if the radio resources for the UE's uplink transmission are not allocated, the SR/BSR transmission determiner unit 631 determines whether to retransmit the SR/BSR, based on the lowest priority for permitting SR/BSR transmission, which is received in the downlink through the transceiver unit 621. According to the determination, the SR/BSR transmission determiner unit 631 retransmits the SR/BSR or continues to receive a resource grant channel and the lowest priority for permitting SR/BSR transmission, which is cyclically transmitted in the downlink. As described in connection with FIG. 3, the SR/BSR transmission determiner unit 631 determines to retransmit the SR/BSR only when the highest priority included in the SR/BSR to be retransmitted is equal to or higher than the lowest priority for permitting SR/BSR transmission, received in the downlink. The timer 641 determines a cycle in which the lowest priority for permitting SR/BSR transmission is transmitted.

Although not illustrated in FIG. 3, when even initial SR/BSR transmission is controlled using the lowest priority for permitting SR/BSR transmission, as already described, the lowest priority for permitting SR/BSR transmission is received in downlink through the transceiver unit 621 before an initial SR/BSR is transmitted, and the SR/BSR transmission determiner unit 631 uses the received lowest priority for determining whether to transmit the initial SR/BSR. Further, based on the determination, the transceiver unit 621 transmits the initial SR/BSR or does not retransmit the SR/BSR and continues to receive the lowest priority for permitting SR/BSR transmission, which is cyclically transmitted.

Figure 7:
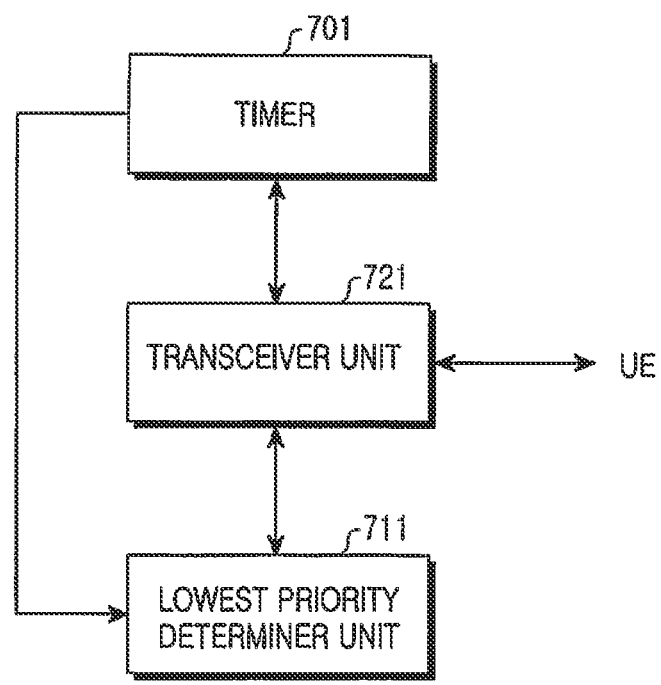
FIG. 7 illustrates the structure of a radio access network in accordance with the first embodiment of the present invention.

FIG. 7 illustrates the structure of an E-NB according to the first embodiment of the present invention.

Referring to FIG. 7, the E-NB according to this embodiment includes a timer 701, a transceiver unit 721 and a lowest priority determiner unit 711.

The timer 701 determines a cycle in which the lowest priority for permitting SR/BSR transmission is transmitted in the downlink. The lowest priority determiner unit 711 sets the lowest priority for permitting SR/BSR transmission by considering the lowest one of priorities included in SR/BSRs for which radio resources have been successfully allocated from among SR/BSRs that the E-NB has already received from UEs within a cell or a cell load status. The transceiver unit 721 cyclically transmits the lowest priority for permitting SR/BSR transmission, set by the lowest priority determiner unit 711, in the downlink to UEs over a corresponding channel.

In the aforementioned first embodiment of the present invention, the lowest priority notified in the downlink to a UE is compared with the highest priority included in an SR/BSR, but a UE/user class level or the data rate of a service to be requested may be compared with a permissible UE/user class level or a permissible service data rate.

In a second embodiment of the present invention, retransmission timers according to priorities are defined. If requested radio resources are not allocated after an SR/BSR is initially transmitted, the SR/BSR is retransmitted after the elapse of a time set by a retransmission timer corresponding to the highest priority among priorities included in the SR/BSR to be retransmitted. In this manner, an SR/BSR with a lower priority is transmitted relatively less frequently than an SR/BSR with a higher priority, so that SR/BSR retransmission can be optimized.

Figure 8:
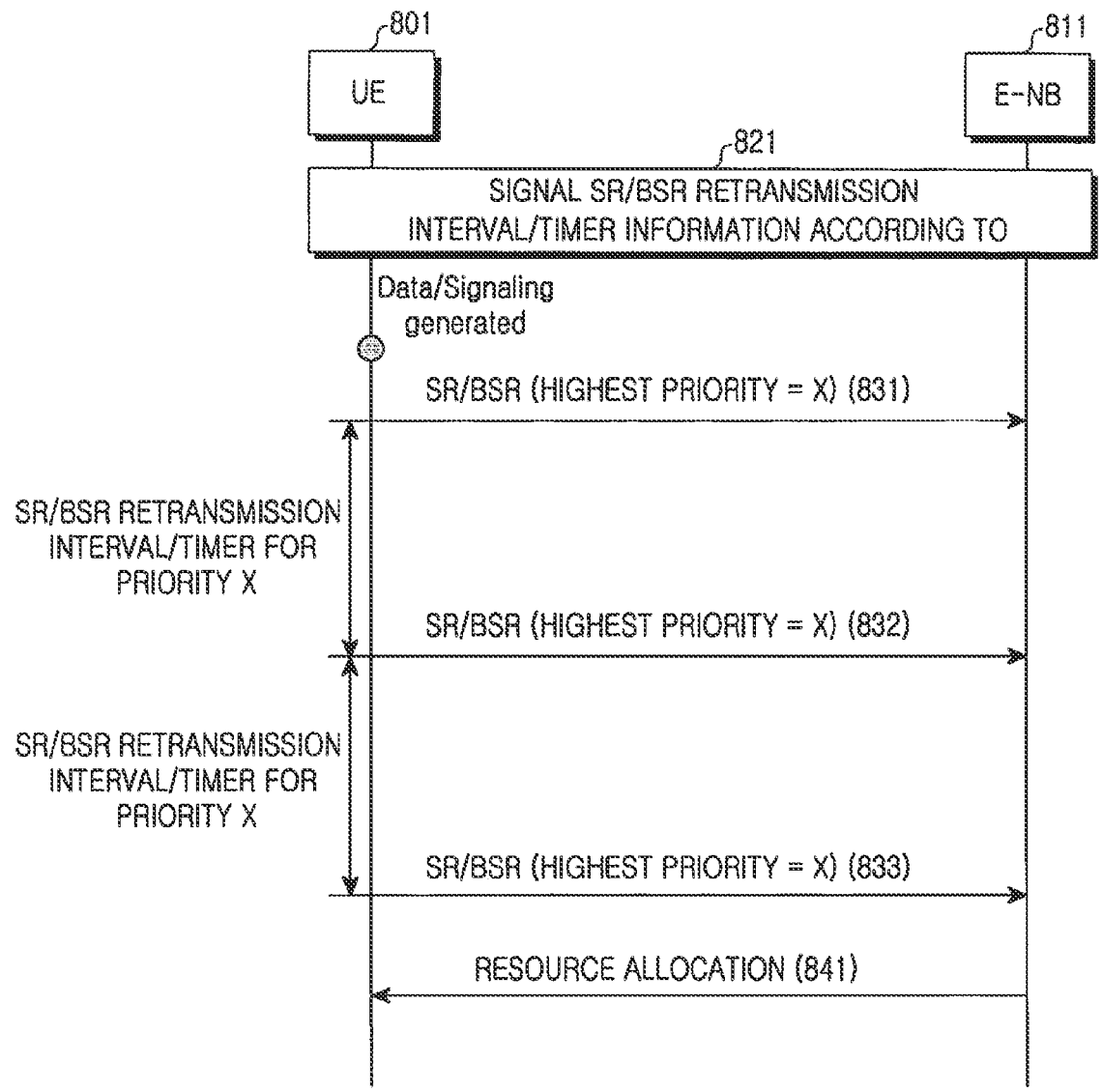
FIG. 8 illustrates a method for efficiently controlling the retransmission of an SR/BSR in a state where a cell is loaded with radio resources in accordance with a second embodiment of the present invention.

FIG. 8 illustrates a procedure of retransmitting an SR/BSR according to the second embodiment of the present invention.

Referring to FIG. 8, as designated by reference numeral 821, a UE 801 within a cell acquires cycle (timer) information for SR/BSR retransmission, which is defined according to priorities. The cycle information may be transmitted through system information broadcasted within the cell, transmitted UE by UE through signaling, or prearranged between the UE 801 and an E-NB 811 by an implicit rule. If the cycle information is prearranged by an implicit rule, this may be implemented as hard coding within the UE. Although the present invention is not limited to a specific scheme, it is assumed in FIG. 8 that the UE 801 acquires the cycle information through system information.

If data or control signals to be transmitted in the uplink are generated in the UE 801 by an upper layer and transferred to a transmission buffer, the UE 801 transmits an SR/BSR 831 to the E-NB 811, and starts a cycle (timer) corresponding to the highest priority included in the SR/BSR 831 by using the acquired cycle information according to priorities. That is, assuming in FIG. 8 that the highest priority included in the SR/BSR 831 is "X", a cycle (timer) corresponding to X is started.

If the UE 801 receives a resource grant channel after transmitting the SR/BSR 831, but cannot be allocated with radio resources for the UE 801 through SI received during the SR/BSR retransmission cycle corresponding to the highest priority X, it retransmits the SR/BSR when the retransmission cycle (timer) expires, and restarts the retransmission timer, as designated by reference numeral 832. If the UE 801 cannot be allocated with radio resources even during the second retransmission cycle, it retransmits the SR/BSR when the restarted timer expires, as designated by reference numeral 833. That is, if radio resources for the UE 801 are not allocated, the UE 801 performs retransmission according to the cycle information corresponding to the highest priority included in the SR/BSR.

The retransmission cycle may be differently set according to priorities. That is, a longer retransmission cycle is set for an SR/BSR with a relatively low priority so that the SR/BSR is transmitted less frequently, and a shorter retransmission cycle is set for an SR/BSR with a relatively high priority so that the SR/BSR is transmitted more frequently. In this manner, SR/BSR retransmission can be optimized.

Although not illustrated in FIG. 8, it is also possible to start the retransmission cycle (timer) corresponding to the highest priority X not when the UE 831 transmits the SR/BSR, but when the UE 801 determines that it receives the resource grant channel but cannot be allocated with radio resources for the UE 801 through the SI.

Further, the highest priority included in the SR/BSR may be changed in the process of SR/BSR retransmission, and subsequently the UE 801 retransmits the SR/BSR according to a retransmission cycle corresponding to the changed highest priority.

Figure 9:
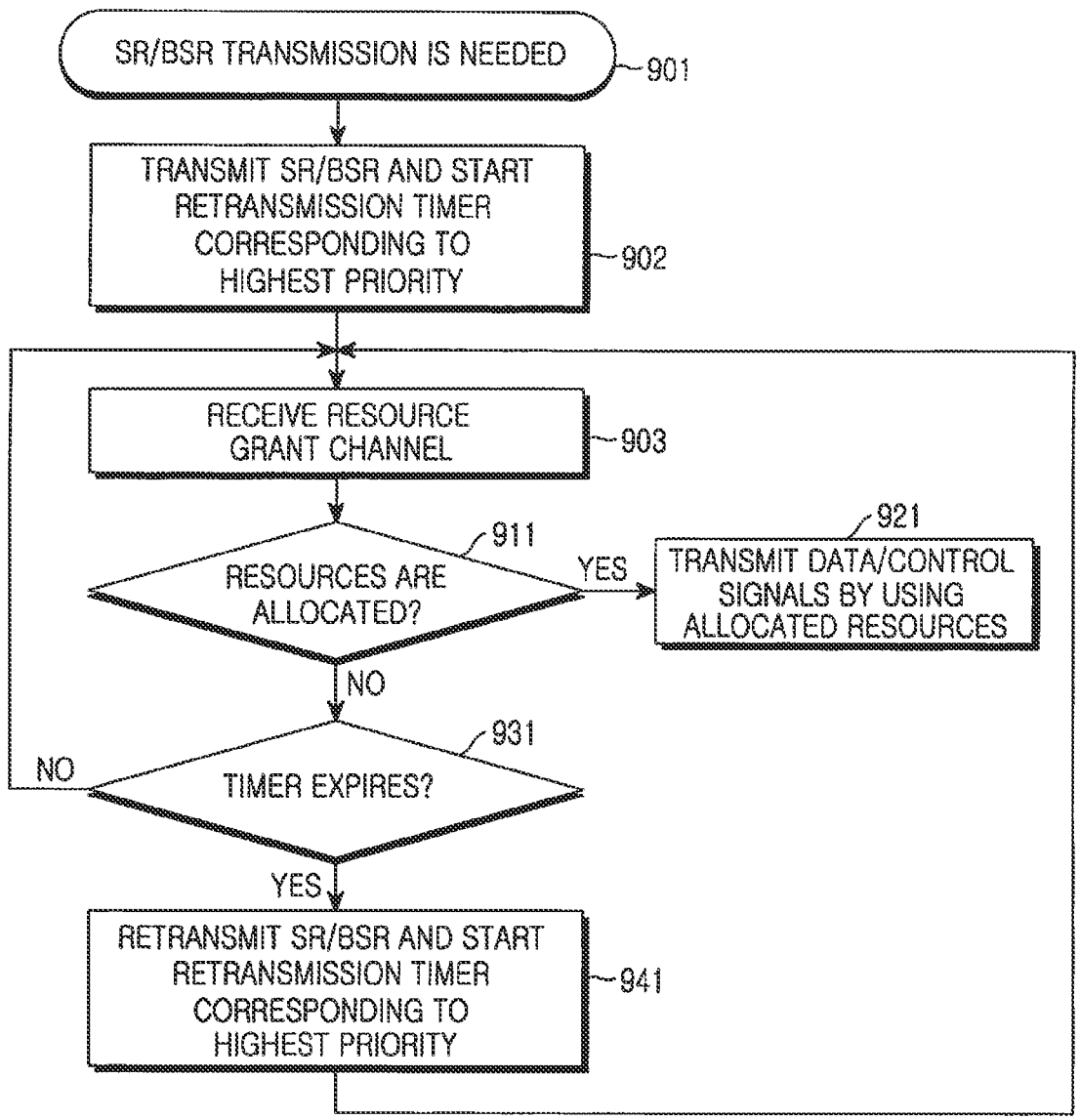
FIG. 9 illustrates the operation of a terminal in accordance with the second embodiment of the present invention.

FIG. 9 illustrates the operation of a UE according to the second embodiment of the present invention.

Referring to FIG. 9, if data or control signals to be transmitted in the uplink are generated by an upper layer and transferred to a transmission buffer in step 901, and thus the UE detects a need for SR/BSR transmission, the UE transmits an SR/BSR to an E-NB in step 902. Further, using SR/BSR retransmission cycle (timer) information according to priorities, which has been already acquired through system information or signaling according to UEs, the UE starts a retransmission cycle (timer) corresponding to the highest priority included in the SR/BSR transmitted in step 902.

Next, the UE receives a resource grant channel in step 903. In step 911, using SI included in the received resource grant channel, the UE determines whether radio resources for the UE are allocated. If radio resources for the UE are allocated, the UE proceeds to step 921, and transmits the data or control signals in the transmission buffer by using the allocated radio resources. However, if radio resources for the UE are not allocated, the UE proceeds to step 931, and determines whether the cycle (timer) started in step 902 expires. If the cycle (timer) does not expire, the UE returns to step 903. However, if the cycle (timer) expires, the UE proceeds to step 941, and retransmits the SR/BSR, starts a retransmission cycle (timer) corresponding to the highest priority included in the retransmitted SR/BSR and then returns to step 903.

Figure 10:
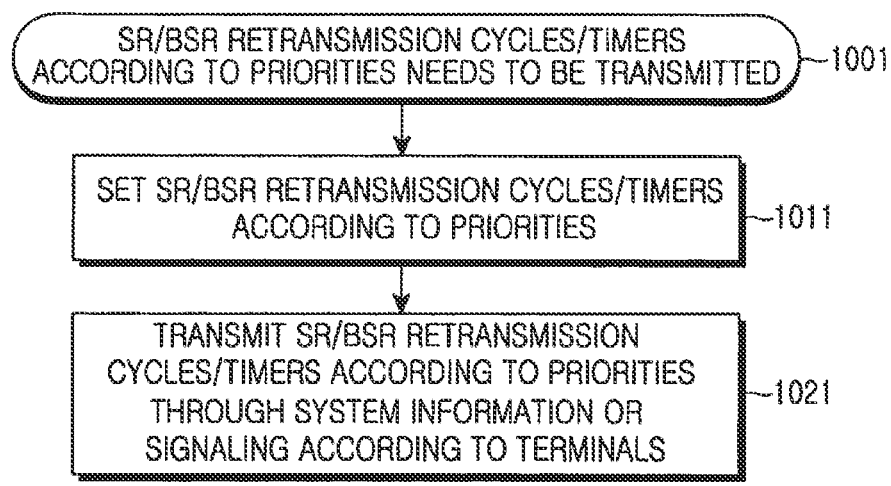
FIG. 10 illustrates the operation of a radio access network in accordance with the second embodiment of the present invention.

FIG. 10 illustrates the operation of an E-NB according to the second embodiment of the present invention.

Referring to FIG. 10, in step 1001, the E-NB detects that it is time to transmit SR/BSR retransmission cycle (timer) information according to priorities through system information or detects a need for transmitting the information through signaling according to UEs. In step 1011, the E-NB sets the SR/BSR retransmission cycle (timer) information according to priorities by considering such information as a radio resource status (e.g., cell load status) and SR/BSRs received from UEs within a cell. In step 1021, the E-NB transmits the SR/BSR retransmission cycle (timer) information according to priorities to UEs through system information or signaling according to UEs.

Figure 11:
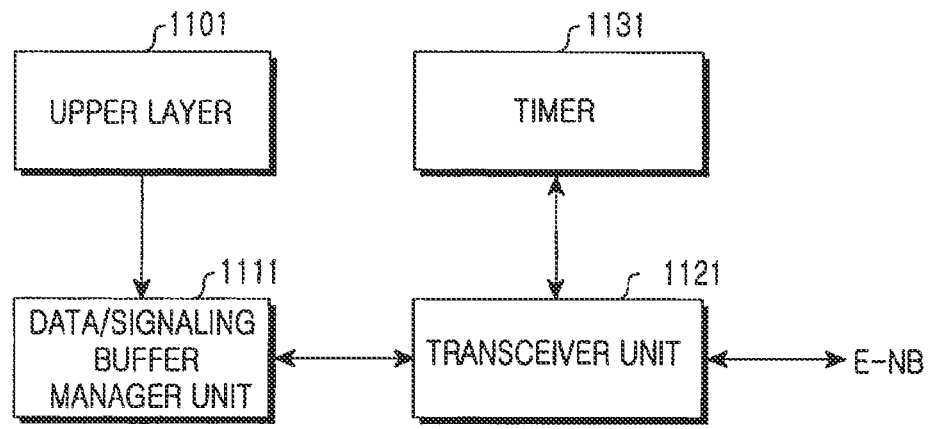
FIG. 11 illustrates the structure of a terminal in accordance with the second embodiment of the present invention.

FIG. 11 illustrates the structure of a UE according to the second embodiment of the present invention.

Referring to FIG. 11, the UE includes an upper layer 1101, a data/signaling buffer manager unit 1111, a transceiver unit 1121 and a timer 1131.

The upper layer 1101 includes both an upper control unit for generating control signals and an upper application unit for generating data. Data or control signals generated in the upper layer 1101 are transferred to a transmission buffer (not shown). If the transmission buffer is filled with the data or control signals transferred from the upper layer 1101, the data/signaling buffer manager unit 1111 transmits an SR/BSR to an E-NB through the transceiver unit 1121 in order to request the E-NB to allocate radio resources for uplink transmission. Using SR/BSR retransmission cycle (timer) information according to priorities, which has been already acquired through signaling according to UEs, the timer 1131 starts a retransmission cycle (timer) corresponding to the highest priority included in the SR/BSR transmitted by the UE. According to a resource grant channel signal received in the downlink through the transceiver unit 1121 after transmitting the SR/BSR, the UE determines whether radio resources for the UE's uplink transmission are allocated. If the radio resources for the UE's uplink transmission are allocated, the UE transmits the data or control signals in the transmission buffer through the transceiver unit 1121 by using the allocated radio resources. However, if the radio resources for the UE's uplink transmission are not allocated, the UE determines whether the previously started cycle (timer) expires. If the cycle (timer) expires, the UE retransmits the SR/BSR through the transceiver unit 1121, and starts a cycle (timer) corresponding to the highest priority included in the retransmitted SR/BSR.

Figure 12:
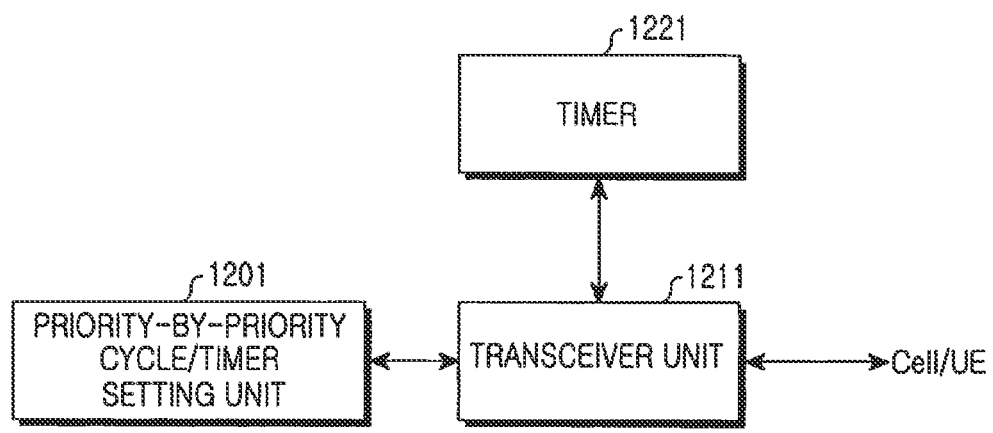
FIG. 12 illustrates the structure of a radio access network in accordance with the second embodiment of the present invention.

FIG. 12 illustrates the structure of an E-NB according to the second embodiment of the present invention.

Referring to FIG. 12, the E-NB includes a priority-by-priority cycle/timer setting unit 1201, a transceiver unit 1211 and a timer 1221.

The priority-by-priority cycle/timer setting unit 1201 sets SR/BSR retransmission cycles (timers) according to priorities. That is, the priority-by-priority cycle/timer setting unit 1201 sets a corresponding retransmission cycle (timer) on a priority-by-priority basis by considering such information as a radio resource status (e.g., cell load status) and SR/BSRs received from UEs within a cell. The transceiver unit 1211 of the E-NB transmits the set retransmission cycle (timer) according to each priority to a corresponding UE through system information or signaling according to UEs. If the retransmission cycle (timer) set on a priority-by-priority basis is transmitted through system information, the system information may be cyclically transmitted according to the settings of the timer 1221.

The aforementioned first and second embodiments of the present invention may be performed simultaneously rather than separately. For example, SR/BSR retransmission can be repeatedly and cyclically performed according to retransmission cycles according to priorities by applying the first embodiment of the present invention when the highest priority transmitted to an E-NB by a UE is lower than the lowest permissible priority received from the E-NB, and simultaneously applying the first and second embodiments of the present invention when the highest priority is equal to or higher than the lowest permissible priority.

As describe above, the present invention can effectively prevent terminals from unnecessarily retransmitting SR/BSRs, which may be caused when a radio resource controlling node successfully receives SR/BSRs from the terminals, and yet cannot allocate corresponding radio resources to all of the terminals.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of transmitting an uplink scheduling request in a mobile communication system, the method comprising the steps of:
    setting scheduling request transmission cycles according to priorities between a terminal and a radio resource controlling node;
    transmitting, by the terminal, the scheduling request to the radio resource controlling node according to a scheduling request transmission cycle corresponding to a highest priority among priorities corresponding to uplink data or uplink control signals to thereby request the radio resource controlling node to allocate radio resources for transmitting the uplink data or the uplink control signals, if the uplink data or the uplink control signals are generated from an upper layer;
    receiving, by the terminal, scheduling information from the radio resource controlling node over a resource grant channel, and determining whether resource allocation information is included in the scheduling information; and
    cyclically retransmitting, by the terminal, the scheduling request to the radio resource controlling node in the scheduling request transmission cycle corresponding to the highest priority among the priorities corresponding to the uplink data or the uplink control signals, if the resource allocation information is not included in the scheduling information.

2. The method as claimed in claim 1, wherein setting the scheduling request transmission cycles comprises acquiring scheduling request transmission cycle information through system information received from the radio resource controlling node.

3. The method as claimed in claim 1, wherein setting the scheduling request transmission cycles further comprises setting scheduling request transmission cycle information by an implicit rule between the radio resource controlling node and the terminal.

4. The method as claimed in claim 1, wherein the priorities are service priorities according to radio bearers corresponding to the uplink data or the uplink control signals or according to a priorities channel for the uplink data or the uplink control signals.

5. A terminal apparatus comprising:
    a buffer manager unit for storing uplink data or uplink control signals, which are transferred from an upper layer, in a buffer, and controlling a scheduling request to be transmitted to a radio resource controlling node according to a status of the buffer to thereby request the radio resource controlling node to allocate radio resources;
    a transceiver unit for transmitting or retransmitting the scheduling request to the radio resource controlling node according to a scheduling request transmission cycle corresponding to a highest priority among priorities corresponding to the uplink data or the uplink control signals, and receiving scheduling information from the radio resource controlling node over a resource allocation channel after transmitting the scheduling request; and
    a timer for acquiring transmission cycle information for the scheduling request according to the priorities from the radio resource controlling node through the transceiver unit, and controlling the transceiver unit to cyclically transmit and retransmit the scheduling request in the transmission cycle corresponding to the highest priority, included in the transmission cycle information when the resource allocation information is not included in the scheduling information.

6. The terminal apparatus as claimed in claim 5, wherein the transceiver unit acquires the transmission cycle information through system information received from the radio resource controlling node.

7. The terminal apparatus as claimed in claim 5, wherein the priorities are service priorities according to radio bearers corresponding to the uplink data or the uplink control signals or according to a priorities channel for the uplink data or the uplink control signals.

* * * * *